(12) United States Patent
Opperthauser (10) Patent No.: US 7,520,475 B2
(45) Date of Patent: Apr. 21, 2009

(54) PIPE INSULATING COUPLING WITH INTEGRATED MOUNTING CLAMP AND CLOSURE MECHANISM

(75) Inventor: Orval A Opperthauser, Atlantis, FL (US)

(73) Assignee: Klo-Shure, Inc., Auburn Hills, MI (US)

( * ) Notice: Subject to any disclaimer, the term of this patent is extended or adjusted under 35 U.S.C. 154(b) by 0 days.

(21) Appl. No.: 11/654,958

(22) Filed: Jan. 18, 2007

(65) Prior Publication Data
US 2008/0173773 A1 Jul. 24, 2008

(51) Int. Cl.
F16B 45/00 (2006.01)
(52) U.S. Cl. .................. 248/71; 139/149; 248/74.1; 248/74.2; 248/74.3
(58) Field of Classification Search ........... 248/74.1, 248/74.2, 74.3, 71, 65; 138/149, 158, 166, 138/165, 167, 112
See application file for complete search history.

(56) References Cited

U.S. PATENT DOCUMENTS

| | | | |
|---|---|---|---|
| 1,820,845 A | | 8/1931 | Sterling |
| 3,058,860 A | | 10/1962 | Rutter |
| 3,463,428 A | | 8/1969 | Kindorf et al. |
| 4,564,163 A | | 1/1986 | Barnett |
| 5,219,427 A | | 6/1993 | Harris |
| 5,347,787 A | * | 9/1994 | Gavin .................. 52/677 |
| 5,836,367 A | * | 11/1998 | Calabrese .............. 138/112 |
| 5,873,550 A | | 2/1999 | Phillips |
| 6,126,119 A | * | 10/2000 | Giangrasso ............... 248/58 |
| 6,315,006 B1 | * | 11/2001 | Opperthauser ........... 138/149 |
| 6,460,813 B1 | * | 10/2002 | Gretz ....................... 248/62 |
| 6,465,741 B2 | * | 10/2002 | Pionek et al. ............ 174/174 |
| 7,017,867 B2 | * | 3/2006 | Sono ..................... 248/74.1 |
| 7,055,784 B2 | * | 6/2006 | Stigler ................... 248/74.1 |
| 7,168,452 B2 | * | 1/2007 | Sasaki et al. ............. 138/110 |
| 7,322,380 B2 | * | 1/2008 | Opperthauser ........... 138/149 |
| 2002/0108662 A1 | * | 8/2002 | Opperthauser ........... 138/149 |
| 2004/0200936 A1 | | 10/2004 | Opperthauser |
| 2006/0284027 A1 | * | 12/2006 | Smith et al. .............. 248/65 |

FOREIGN PATENT DOCUMENTS

FR 2729210 * 7/1996

* cited by examiner

*Primary Examiner*—Ramon O Ramirez
(74) *Attorney, Agent, or Firm*—Clark Hill PLC (57) ABSTRACT

A pipe insulation coupling secures a pipe and adjacent ends of insulation tubing surrounding the pipe to a channel-section track having a pair of inwardly turned flanges. The coupling includes a one-piece elongated cylindrical body having an outer tube wall extending between first and second ends. A planar interior wall disposed midway between the first and second ends extends inwardly from the outer tube wall to a center bore for receiving the pipe therethrough. The planar wall defines opposing first and second channels extending from the planar wall to the first and second ends for receiving the adjacent ends of the insulation tubing therein. A pair of flexible and resilient legs extends between a proximal end fixedly secured to the outer tube wall and a distal end including opposing notches formed therein for selective engagement with the flanges of the track thereby locking the coupling to the track.

22 Claims, 7 Drawing Sheets

PIPE INSULATING COUPLING WITH INTEGRATED MOUNTING CLAMP AND CLOSURE MECHANISM

BACKGROUND OF THE INVENTION

1. Field of the Invention

The invention relates to a pipe insulation coupling for supporting a pipe along a support structure. More particularly, the invention relates to a pipe insulation coupling having an integrated mounting clamp to support a pipe, which is encased by insulation tubing, along a support structure and an integrated closure mechanism.

2. Description of Related Art

Conventional pipes are used to convey or transfer fluids or gases in various industrial applications, such as sprinkler systems, refrigeration systems, and heating and cooling systems. These pipes are commonly encased in a cellular foam pipe insulation tubing, which maintains the fluids within the pipes at a desired temperature. The pipe insulation tubing is typically provided in predetermined lengths that are aligned end-to-end to cover an entire length of the pipe. It is desirable to interconnect adjacent ends of the pipe insulation tubing along the pipe to increase the insulation characteristics and efficiency of the pipe. The adjacent ends of the pipe insulation tubing are typically interconnected by tape, adhesive or straps. These means for interconnection are, however, susceptible to wear and tear over time. As an alternative, various pipe insulation coupling members have been introduced to provide a secure and long-lasting end-to-end attachment of adjacent pipe insulation tubing lengths along the pipe. An example of one type of pipe insulation coupling is disclosed in U.S. Pat. No. 6,315,006 to Opperthauser.

In a typical application, the insulated pipe, that is, the pipe encased by the pipe insulation tubing, is disposed along a support structure, such as a ceiling or wall. The insulated pipe is commonly supported along the ceiling by a plurality of spaced apart clevis hangers. Each clevis hanger typically includes an upper member mounted to the ceiling, and a generally U-shaped lower member for supporting the insulated pipe. The shape of the U-shaped lower member complements that of an outer periphery of an insulated pipe, thereby allowing the U-shaped lower member to retain the insulated pipe therein. An example of this type of clevis hanger is disclosed in U.S. Pat. No. 5,219,427 to Harris.

Alternatively, the insulated pipe is commonly supported along the ceiling or wall by lengths of channel-section track secured thereto on which are mounted spaced apart support devices or pipe mounting clamps that are clamped to the insulated pipe. U.S. Pat. No. 5,873,550 to Phillips discloses a support device for securing a pipe to a length of channel-section track. The support device includes a clip for retaining the pipe, and a track-engagement portion connected to the clip. A two-part foot forming the track-engagement portion is inserted into the track and by rotating the support device through 90 degrees it is cammingly engaged with the track. U.S. Pat. No. 3,463,428 to Kindorf et al. discloses a generally U-shaped clamp for securing a pipe to a channel-shaped support of the type having inwardly extending flanges defining a longitudinally extending slot. The clamp includes two metal straps, each strap having at least one notch on each edge of a part insertable in the slot for engagement with opposite flanges. Each strap includes a curved portion projecting away from the flanges to embrace the pipe and adjustable means extending between the ends to draw them together to embrace the pipe.

Many prior art clevis hangers, support devices, and pipe mounting clamps disadvantageously comprise a number of components which must be manipulated and assembled in place. This is made particularly difficult by the fact that often times this must be done while an installer is standing on a ladder holding the insulated pipe to be supported. In addition, these types of clevis hangers, support devices, and clamps are labor intensive, costly and inefficient.

U.S. Patent Application Publication No. 2004/0200936 to Opperthauser discloses a pipe support assembly for securing a pipe and adjacent ends of pipe insulation tubing surrounding the pipe to a support structure. The pipe support assembly includes a clevis hanger assembly that includes coupling slots for receiving and retaining a pipe insulation coupling therein, whereby the pipe insulation coupling maintains adjacent ends of the pipe insulation tubing in an end-to-end relationship along the pipe.

It remains desirable, however, to provide a pipe insulation coupling having an integrated mounting clamp to allow for easily securing the coupling to a length of channel-section track. It is also desirable to provide a pipe insulation coupling having an integrated closure mechanism.

SUMMARY OF THE INVENTION

According to one aspect of the invention, a pipe insulation coupling is provided for securing a pipe and adjacent ends of insulation tubing surrounding the pipe to a channel-section track having a pair of inwardly turned flanges. The coupling includes an integrally molded, one-piece elongated cylindrical body extending along a longitudinal axis between a first end and a second end. The cylindrical body includes an outer tube wall extending between the first and second ends. The cylindrical body also includes a planar interior wall fixedly secured to the outer tube wall midway between the first and second ends. The planar wall extends inwardly from the outer tube wall transverse to the longitudinal axis to a center bore defined therein for receiving the pipe therethrough. The planar wall defines opposing first and second channels extending from the planar wall to the first and second ends for receiving the adjacent ends of the insulation tubing therein. The coupling also includes a pair of flexible and resilient legs. Each leg extends between a proximal end fixedly secured to the outer tube wall and a distal end. The distal end of each leg includes opposing notches formed therein for selective engagement with the pair of inwardly turned flanges of the channel-section track thereby locking the coupling to the channel-section track.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
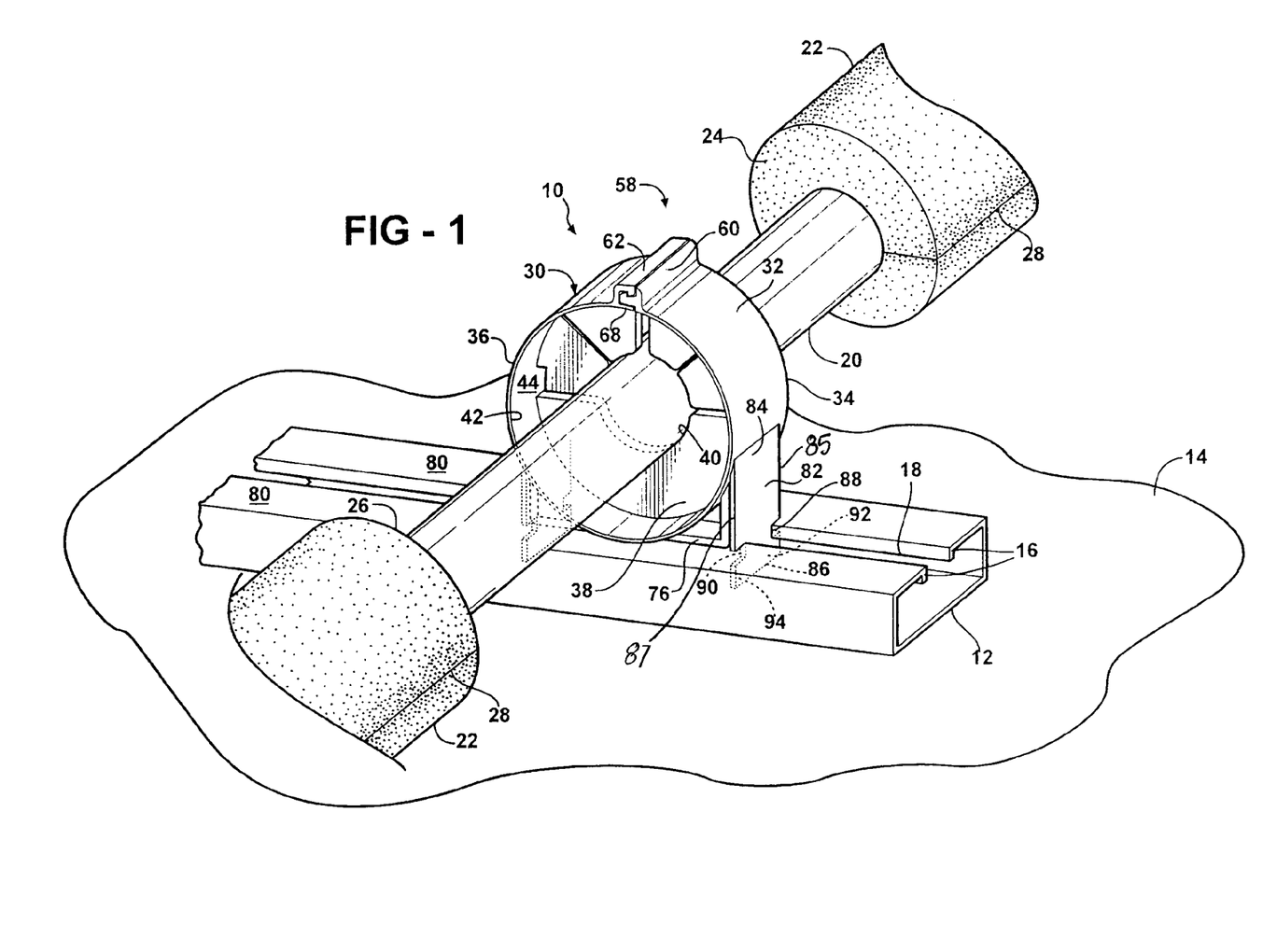
FIG. 1 is a perspective view of a pipe insulation coupling mounted to a channel-section track according to the invention for supporting a pipe and coupling adjacent ends of insulation tubing along the pipe.

Referring to FIG. 1, a pipe insulation coupling, generally shown at 10, is mounted to a length of channel-section track 12 which is secured to a generally planar supporting structure 14, such as a floor, ceiling, wall or similar surface. The channel-section track 12 is commonly known in the art and has a pair of inwardly turned edges or flanges 16 defining a slot 18 therebetween extending longitudinally between opposing ends. The pipe insulation coupling 10 supports an elongated tubular pipe 20 for transferring fluids or gases therethrough and retains an elongated insulation tubing 22 encased around the pipe 20. More specifically, the pipe insulation coupling 10 retains adjacent ends 24, 26 of two separate portions of the insulation tubing 22 adjacent one another to ensure that an entire length of the pipe 20 remains insulated even as the pipe 20 is exposed to wear and tear. The insulation tubing 22, which is commonly formed from cellular polyurethane foam, is provided in predetermined lengths, and includes a longitudinal open slit 28 therealong that allows the insulation tubing 22 to be wrapped around the pipe 20. The pipe 20 is cylindrical, hollow and commonly formed of aluminum or copper and is utilized for hydraulic pipes, pneumatic tubes, refrigeration lines, water pipes, and the like, as are typically known in the art. Both the pipe 20 and the insulation tubing 22 extend along a longitudinal axis.

Referring to FIGS. 1 through 4, the pipe insulation coupling 10 for supporting the pipe 20 and coupling or joining the adjacent ends 24, 26 of the insulation tubing 22 is constructed of a one-piece, integrally molded plastic and includes an elongated cylindrical body, generally indicated at 30. The cylindrical body 30 includes an arcuate outer tube wall 32 extending along the longitudinal axis between a first end 34 adjacent to and aligned with the end 24 of the insulation tubing 22 and a second end 36 adjacent to and aligned with the end 26 of the insulation tubing 22.

A planar interior wall 38 is disposed generally midway between the first 34 and second 36 ends within the outer tube wall 32 and extends transverse to the cylindrical body 30. The planar wall 38 includes a center bore 40 for receiving the pipe 20 therethrough. The planar wall 38 also defines opposing channels 42 (only one shown) extending from the planar wall 38 to the respective first 34 and second 36 ends for receiving the adjacent ends 24, 26 of the insulation tubing 22 therein. In other words, the planar wall 38 is formed integrally with the outer tube wall 32 for abutting with the adjacent ends 24, 26 of the insulation tubing 22.

It is contemplated that the outer tube wall 32 may have a tapered inner surface 44 extending from each of the first 34 and second 36 ends to the planar wall 38 for gradually decreasing the space defined by the channels 42 to frictionally retain the adjacent ends 24, 26 of the insulation tubing 22 within the channels 42 along opposing sides of the planar wall 38. More specifically, the tapered inner surface 44 of the outer tube wall 32 tapers inwardly from each of the first 34 and second 36 ends to the planar wall 38 and decreases the space defined therebetween by the channels 42 such that the space between the outer tube wall 32 and the pipe 20 is less adjacent the planar wall 38 than the space adjacent the first 34 and second 36 ends. Therefore, the thickness of adjacent ends 24, 26 of the insulation tubing 22 surrounding the pipe 20 becomes increasingly compressed by the tapered inner surface 44 from the first 34 and second 36 ends to the planar wall 38 to frictionally retain the adjacent ends 24, 26 in the channels 42. It will also be appreciated that the tapered inner surface 44 may assist with removal of the coupling 10 from a plastic injection mold used in the manufacturing process. Alternatively, the inner surface 44 of the outer tube wall 32 may be parallel to the pipe 20, without a taper, and dimensioned to frictionally retain the adjacent ends 24, 26 of the insulation tubing 22 therein.

Figure 2:
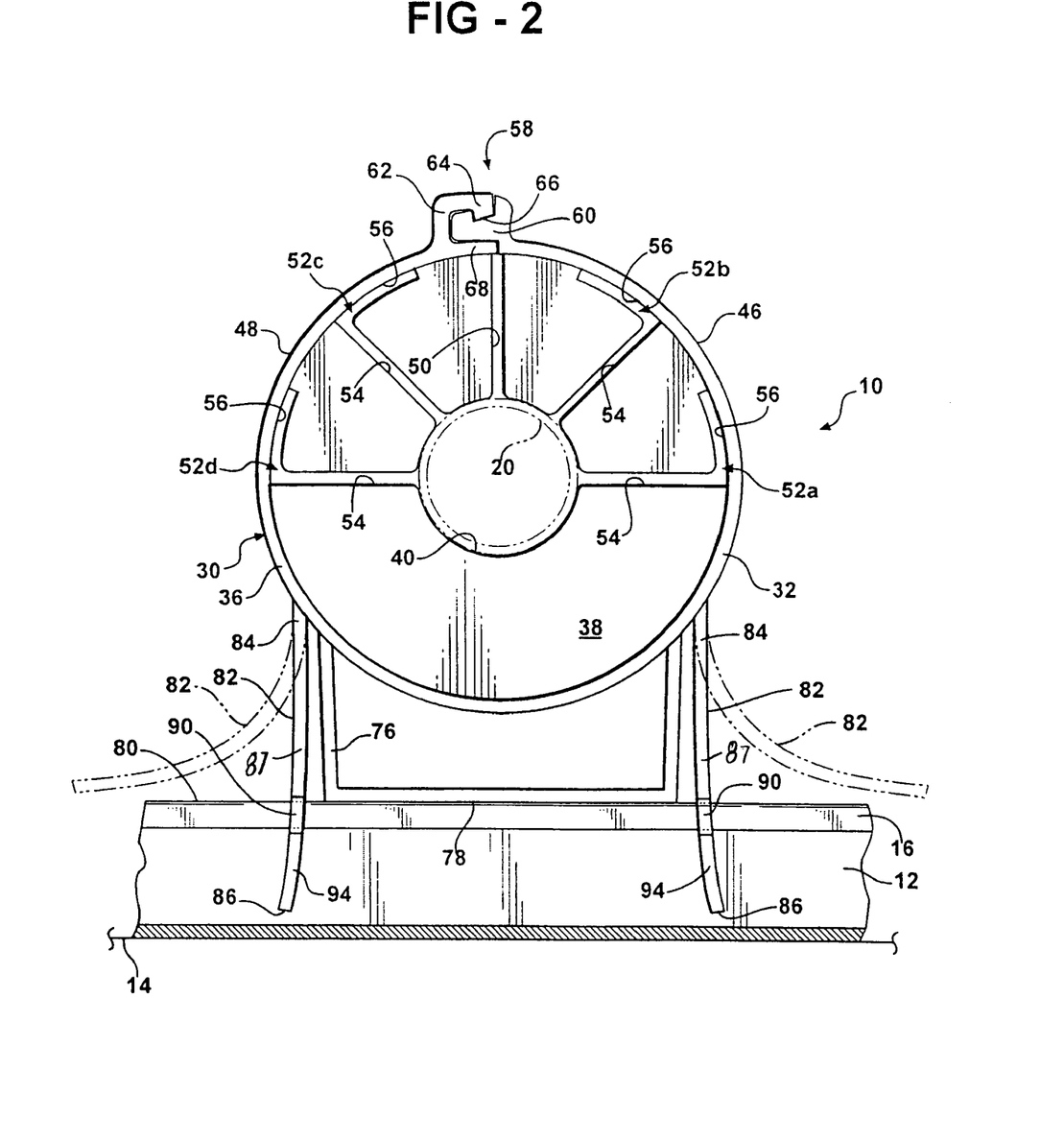
FIG. 2 is a front view of the pipe insulation coupling having separable first and second body portions illustrated in a closed position.
Figure 3:
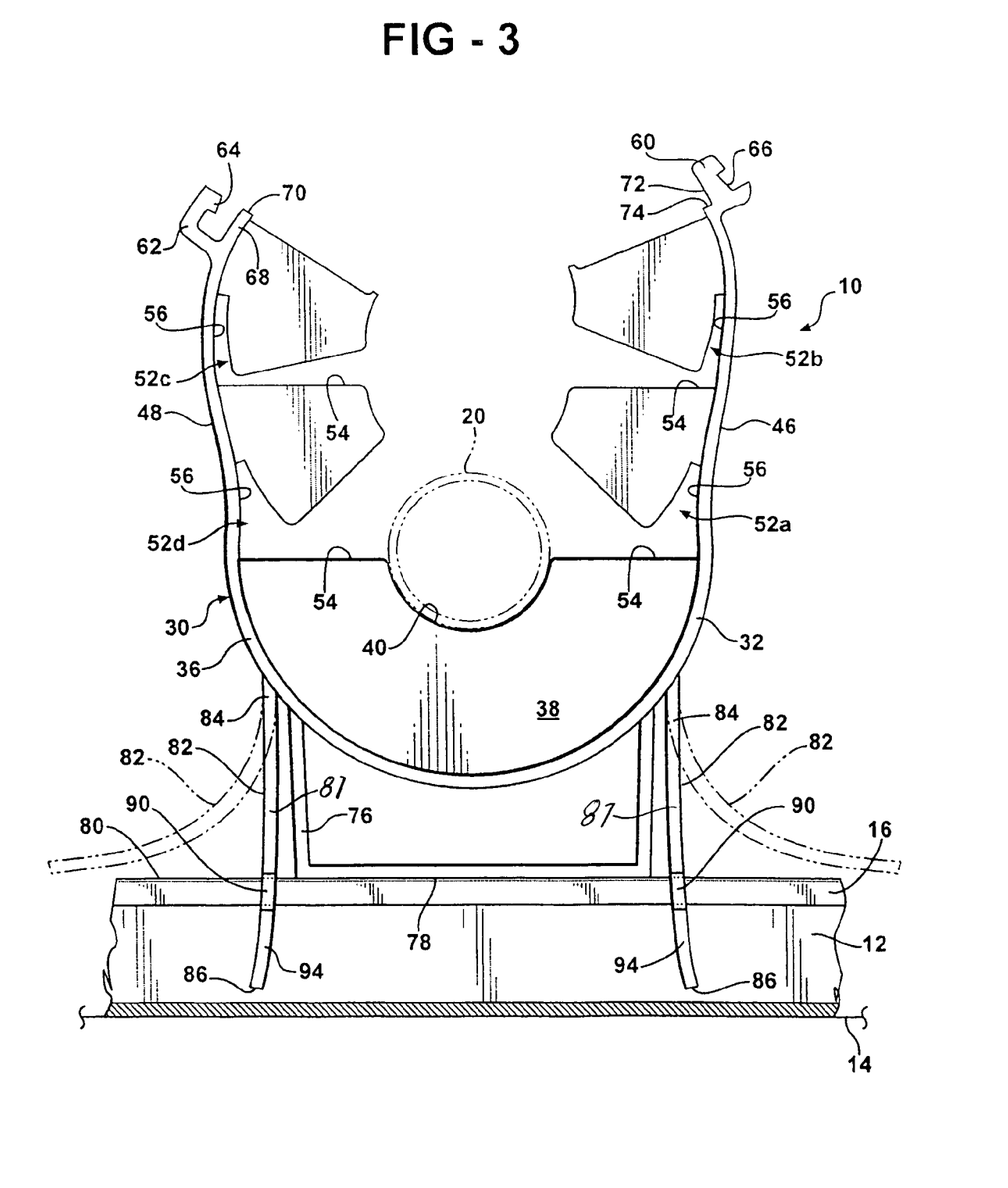
FIG. 3 is a front view of the pipe insulation coupling with the separable first and second body portions illustrated in an open position.
Figure 4:
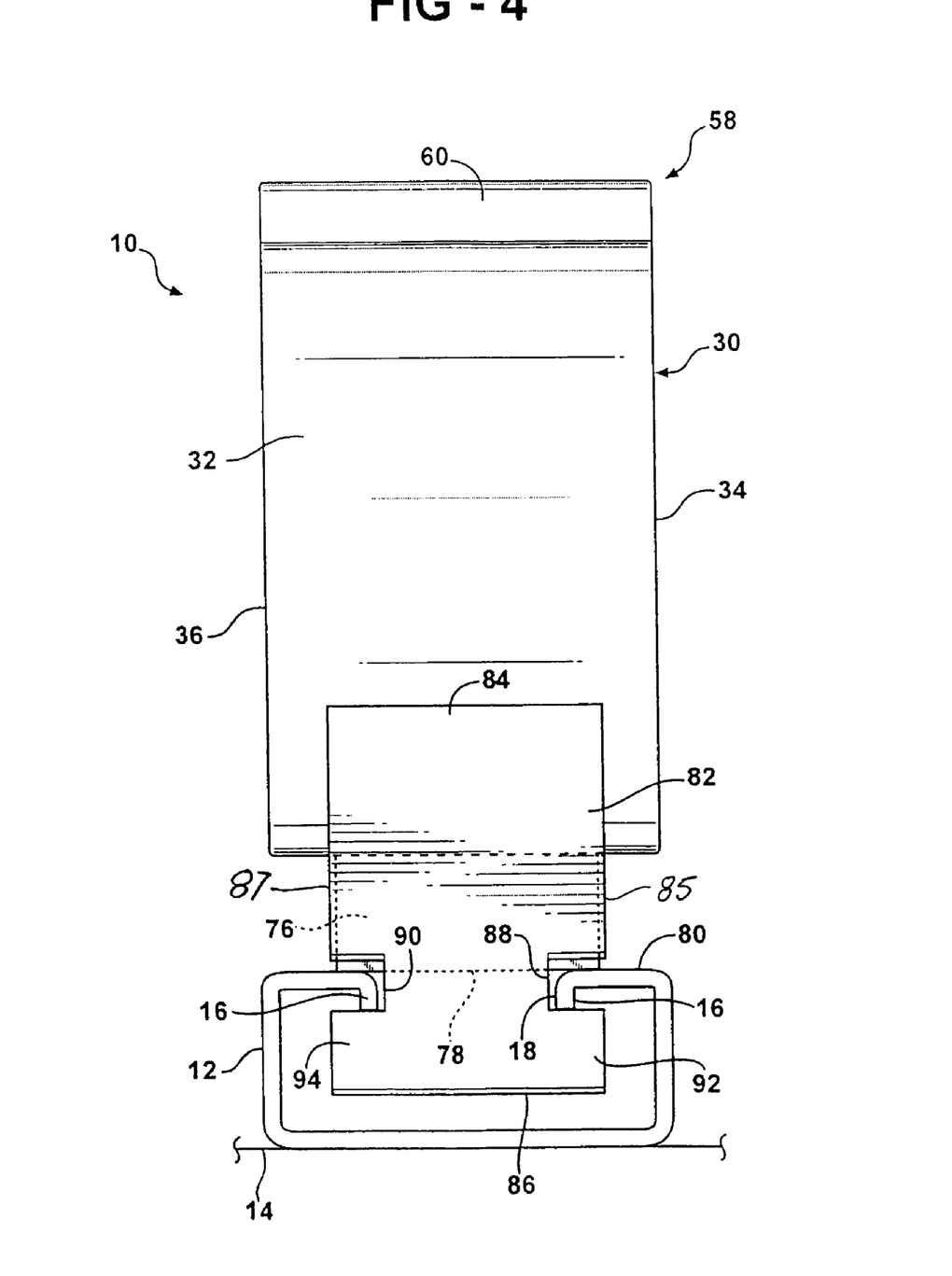
FIG. 4 is side view of the pipe insulation coupling mounted to the channel-section track.

Referring to FIGS. 2 and 3, the outer tube wall 32 of the cylindrical body 30 is split longitudinally from the first end 34 to the second end 36 and includes a first body portion 46 and a second body portion 48. The first 46 and second 48 body portions are separated by an opening or slot 50 in the planar wall 38. The slot 50 extends radially through the planar wall 38 between the center bore 40 and the split in the outer tube wall 32. A plurality of living hinges, generally indicated at 52a, 52b, 52c, 52d, are angularly spaced apart and defined by generally L-shaped slots for flexibly pivoting the first 46 and second 48 body portions between an open position to receive the pipe 20 and the insulation tubing 22, as shown in FIG. 3, and a closed position surrounding the pipe 20 and coupling adjacent ends 24, 26 of the insulation tubing 22, as shown in FIG. 2. Each living hinge 52a, 52b, 52c, 52d includes a linear slot portion 54 extending radially through the planar wall 38 between the center bore 40 and the outer tube wall 32 and an arcuate slot portion 56 intersecting the end of the linear slot 54 and extending generally parallel and adjacent to the outer tube wall 32. The plurality of living hinges 52a, 52b, 52c, 52d allow the outer tube wall 32 of the first 46 and second 48 body portions to easily flex when operating the first 46 and second 48 body portions between the open and closed positions. In the current embodiment, the cylindrical body 30 includes four living hinges 52a, 52b, 52c, 52d, however, it will be appreciated that any number of living hinges may be incorporated without varying from the scope of the invention.

Figure 5:
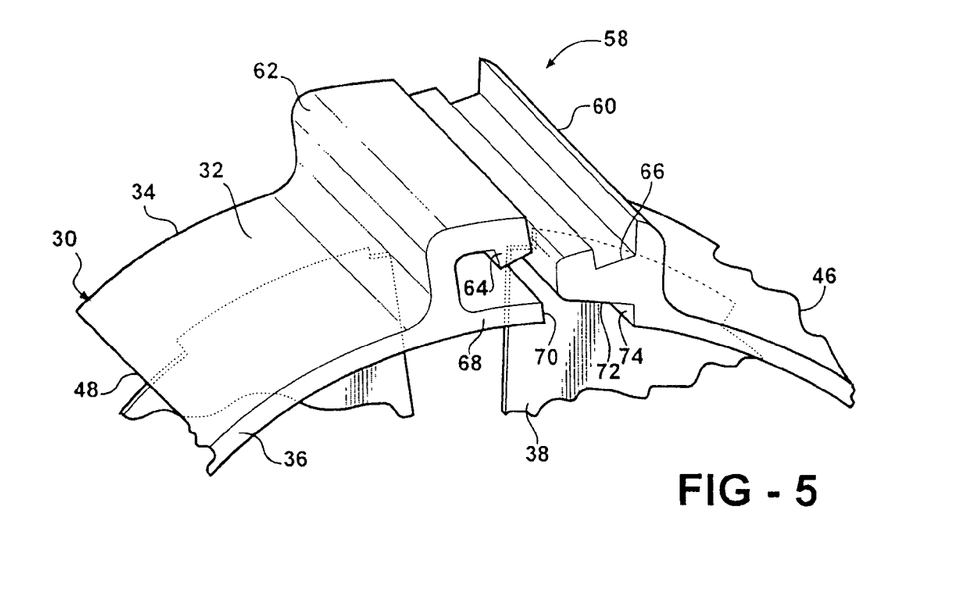
FIG. 5 is an enlarged perspective view of a releasable clamp for securing the first and second body portions of the pipe insulation coupling together.

Referring to FIG. 5, the cylindrical body 30 includes an integrated closure mechanism or releasable clamp, generally shown at 58, for securing the first 46 and second 48 body portions together. The clamp 58 extends longitudinally along the split in the outer tube wall 32 between the first 34 and second 36 ends. The clamp 58 includes a male member 60 and a female member 62. The female member 62 is shaped complementarily with respect to the male member 60. More specifically, a shoulder 64 protruding from the female member 62 lockingly engages a notch 66 formed in the male member 60 when the first 46 and second 48 body portions are in the closed position. In addition, the female member 62 defines a tongue 68 extending circumferentially with the outer tube wall 32 and having a first end surface 70. The male member 60 defines a recessed step 72 for receiving the tongue 68 and having a second end surface 74. In use, the first end surface 70 is parallel to and abuts the second end surface 74 prior to the shoulder 64 lockingly engaging the notch 66 to create tension between the shoulder 64 and notch 66, thereby retaining the first 46 and second 48 body portions in the closed position. It will be appreciated that the tongue 68 creates a smooth surface a full 360 degrees around the inside of the outer tube wall 32 for completely and evenly coupling the adjacent ends 24, 26 of the insulation tubing 22. The male 60 and female 62 members are pulled away from each other to separate the first 46 and second 48 body portions into the open position, as shown in FIG. 3.

Referring to FIGS. 2 and 3, the coupling 10 also includes a base 76 protruding from the outer tube wall 32 between the first 46 and second 48 body portions on the side opposite the clamp 58. The base 76 includes a flat mounting surface 78, which co-operates with an engagement surface 80 of the channel-section track 12 when the coupling 10 is mounted to the channel-section track 12. The coupling 10 further includes an integrated mounting clamp defined by a pair of flexible and resilient legs 82 extending from the outer tube wall 32 adjacent the base 76. The legs 82 are illustrated by hidden lines in an outwardly curved, as-molded position in FIGS. 2 and 3. When the coupling 10 is mounted to the channel-section track 12 the legs 82 are flexed inwardly such that they are generally straight and extend through the slot 18 into the channel-section track 12, as shown in FIGS. 1 through 3. More specifically, each leg 82 extends between a proximal end 84 fixedly secured to the outer tube wall 32 and an opposite distal end 86. Each leg 82 includes a forward edge 85 adjacent to the first end 34 of the outer tube wall 32 and a rearward edge 87 adjacent to the second end 36 of the outer tube wall 32. A pair of opposing notches 88, 90 formed along each leg 82 defines a pair of opposing fingers 92, 94 adjacent the distal end 86 thereof. More specifically, a first one of the notches 88 is formed in the forward edge 85 of each leg 82 and a second one of the notches 90 is formed in the rearward edge 87 of each leg 82. The flanges 16 of the channel-section track 12 are seated in the notches 88, 90 to lock the coupling 10 thereto, best seen in FIGS. 1 and 4.

Figure 7:
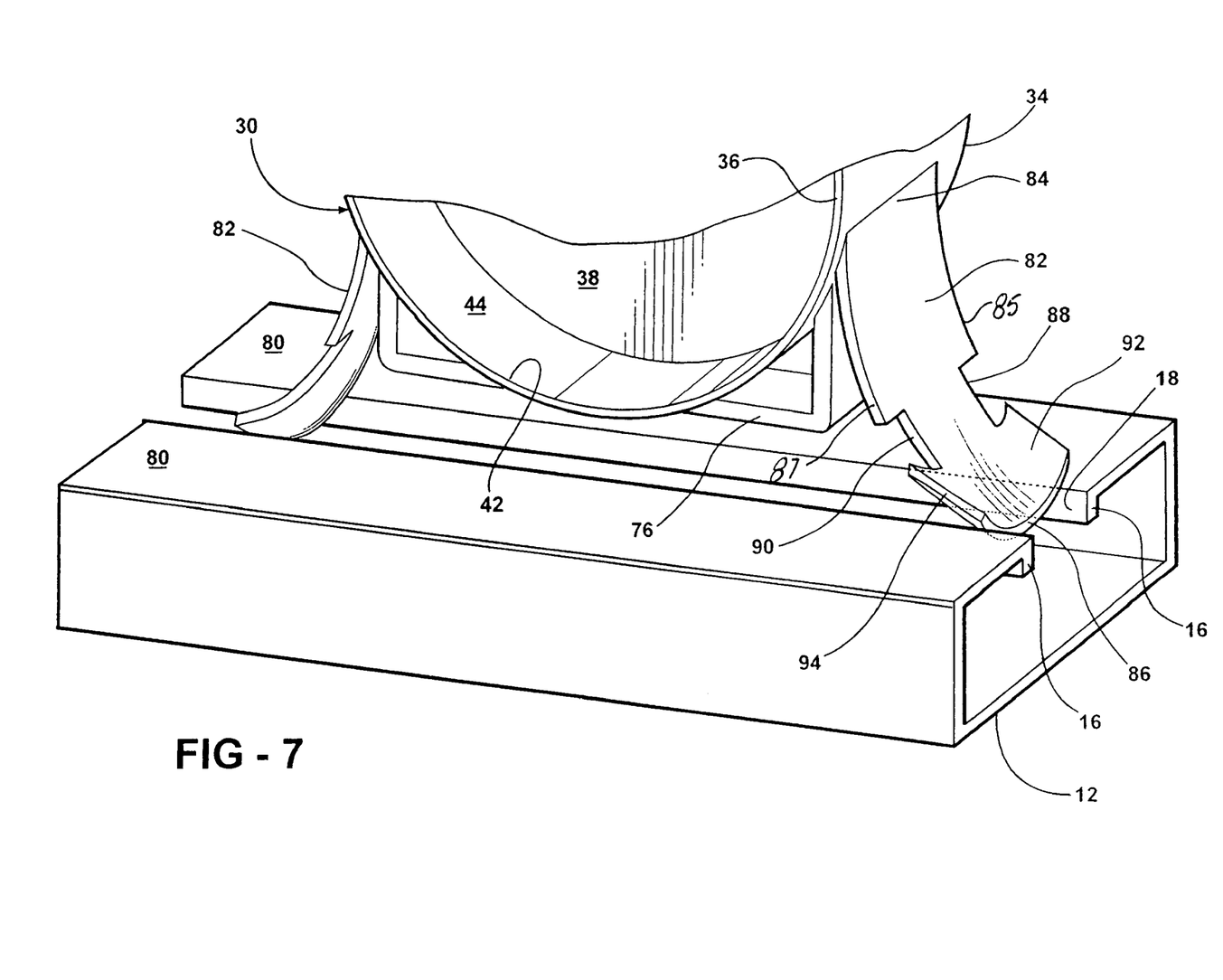
FIG. 7 is a fragmentary perspective view illustrating another method of installing the pipe insulation coupling to the channel-section track.

The fingers 92, 94 at the distal end 86 of each leg 82 are independently flexible relative to the rest of the leg 82, thus allowing the legs 82 to be inserted through the slot 18 rather than sliding the distal end 86 of each leg 82 through an open end of the channel-section track 12. For example, by pushing the coupling 10 and therefore the distal end 86 of each leg 82 against the slot 18 in the engagement surface 80 of the channel-section track 12, the fingers 92, 94 flex allowing the distal end 86 of the leg 82 to be inserted through the slot 18, as shown in FIG. 7. Once the distal end 86 of each leg 82 is through the slot 18 and disposed in the channel-section track 12, the fingers 92, 94 spring-back or rebound to their initial position such that the flanges 16 are seated in the notches 88, 90 thereby locking the coupling 10 to the channel-section track 12. Alternatively, the leg 82 can be twisted to allow the distal end 86 to be inserted through the slot 18 without flexing the fingers 92, 94. In this case, once the distal end 86 of the leg 82 is through the slot 18 and disposed in the channel-section track 12, the leg 82 twists back to its initial position such that the flanges 16 are seated in the notches 88, 90 thereby locking the coupling 10 to the channel-section track 12.

Figure 6:
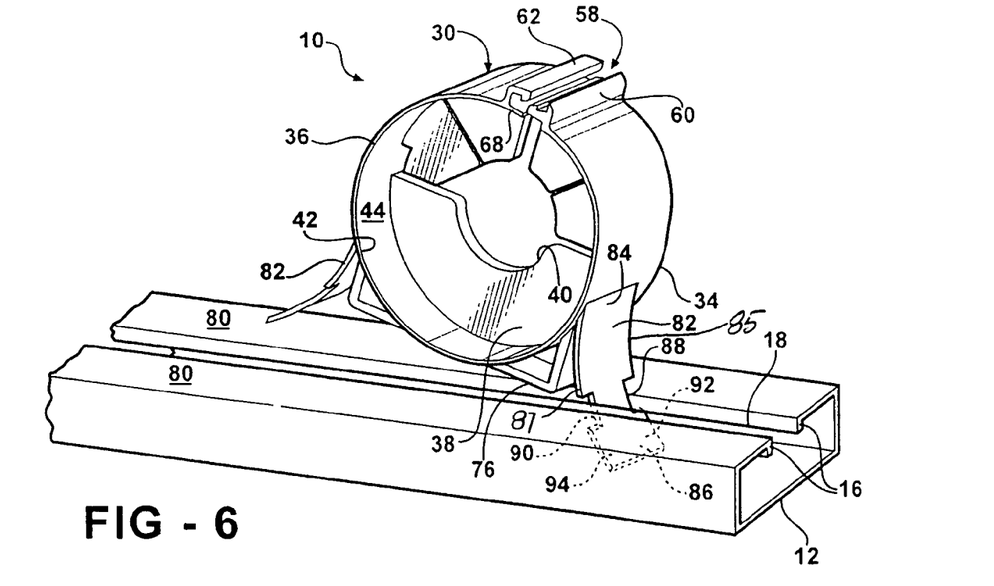
FIG. 6 is a perspective view illustrating one method of installing the pipe insulation coupling to the channel-section track.

The flexible and resilient nature of the legs 82 allows for mounting the coupling 10 to the channel-section track 12 in any of a variety of ways. For example, the coupling 10 can be mounted to the channel-section track 12 at an angle or any of a plurality of angles. In other words, one leg 82 is flexibly inserted into the slot 18 with the coupling 10 disposed at one of the plurality of angles, as shown in FIG. 6. The coupling 10 is then manipulated or rotated about the longitudinal axis to bring the mounting surface 78 of the base 76 flat against the engagement surface 80 of the channel-section track 12, which causes the leg 82 inserted in the slot 18 to flex. Finally, the other leg 82 is flexibly manipulated and inserted into the slot 18 to finish mounting the coupling 10 to the channel-section track 12. Alternatively, the coupling 10 can be mounted to the channel-section track 12 in a parallel manner. In other words, both legs 82 are flexibly inserted through the slot 18 at the same time by pushing the distal end 86 of each leg 82 against the slot 18 in the engagement surface 80 of the channel-section track 12 such that the fingers 92, 94 flex, as described above and shown in FIG. 7.

It will be appreciated that the coupling 10 can first be secured around the pipe 20 and the adjacent ends 24, 26 of the insulation tubing 22 and then mounted to the channel-section track 12. Alternatively, the coupling 10 can first be mounted to the channel-section track 12 and then the coupling 10 is secured around the pipe 20 and the adjacent ends 24, 26 of the insulation tubing 22. In addition, once the coupling 10 is mounted to the channel-section track 12 the male 60 and female 62 members of the clamp 58 can be pulled away from each other to flexibly separate the first 46 and second 48 body portions into the open position to release the pipe 20 and the adjacent ends 24, 26 of the insulation tubing 22 from the coupling 10.

Figure 8:
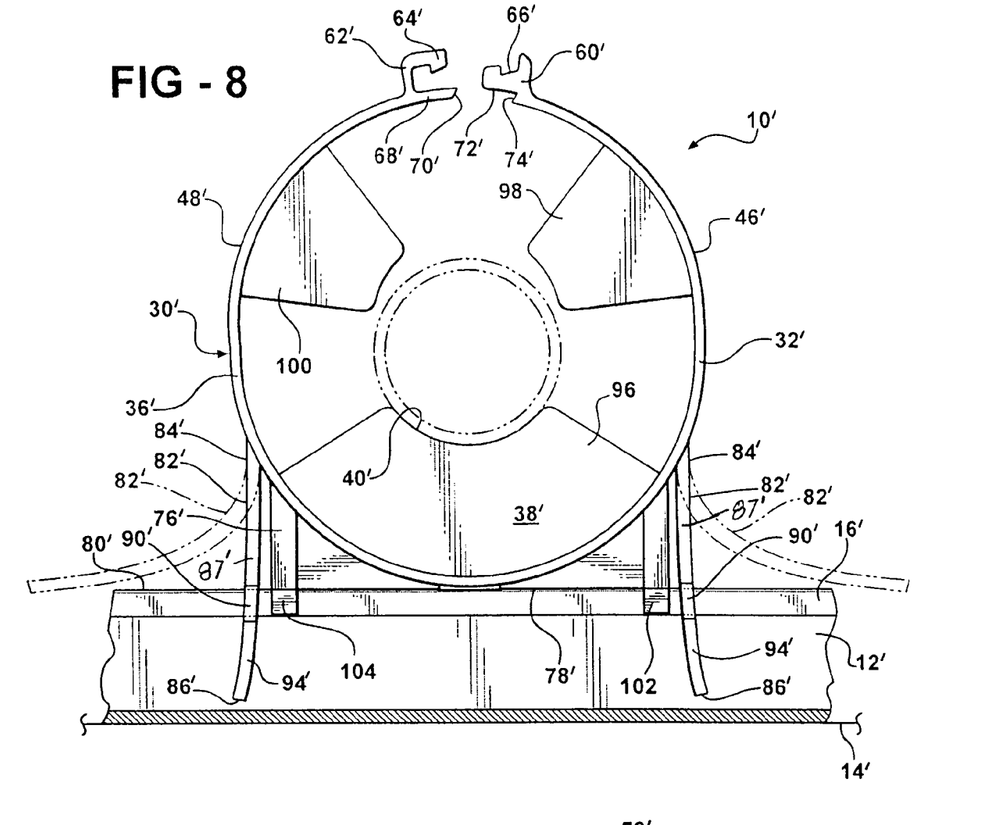
FIG. 8 is a front view of a second embodiment of the pipe insulation coupling.
Figure 9:
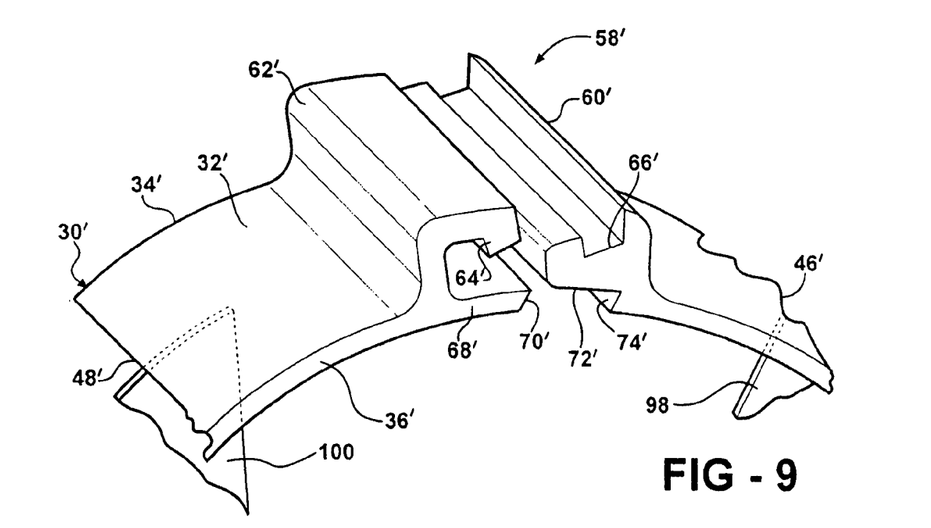
FIG. 9 is an enlarged perspective view of the releasable clamp of the second embodiment.

Referring to FIGS. 8 and 9, wherein like primed reference numerals represent similar elements as those described above, in a second embodiment of the invention the surface area of the planar wall 38' is reduced to allow for flexibly pivoting the first 46' and second 48' body portions between the open and closed positions. More specifically, in the second embodiment, the planar wall 38' includes a lower tab 96 and first 98 and second 100 upper tabs. Treating the cylindrical body 30' like a clock, when the releasable clamp 58' is in the closed position at twelve o'clock (12:00), the first upper tab 98 extends angularly from approximately twelve-forty five (12:45) to approximately two-fifteen (2:15), the lower tab 96 extends angularly from approximately four o'clock (4:00) to approximately eight o'clock (8:00), and the second upper tab 100 extends angularly from approximately nine-forty five (9:45) to approximately eleven-fifteen (11:15). In other words, assuming that the releasable clamp 58' is at zero degrees (0°), the first upper tab 98 extends angularly from approximately 22.5° to approximately 67.5°, the lower tab 96 extends angularly from approximately 120° to approximately 240°, and the second upper tab 100 extends angularly from approximately 292.5° to approximately 337.5°.

Referring to the releasable clamp 58' in the second embodiment, the female 62' and male 60' members include angled first 70' and second 74' end surfaces, respectively. More specifically, the first end surface 70' of the tongue 68' is angled approximately thirty (30) degrees from vertical. Similarly, the second end surface 74' of the recessed step 72' is angled approximately thirty (30) degrees from vertical and is parallel to the first end surface 70'. In use, the first end surface 70' abuts the second end surface 74' prior to the shoulder 64' lockingly engaging the notch 66' to create tension between the shoulder 64' and notch 66', thereby retaining the first 46' and second 48' body portions in the closed position.

The base 76' in the second embodiment includes first 102 and second 104 portions which are slightly narrower than the width of the slot 18' in the channel-section track 12'. The first 102 and second 104 portions extend into the slot 18' when the coupling 10' is mounted to the channel-section track 12'. The first 102 and second 104 portions along with the flat mounting surface 78' of the base 76' cooperate to stabilize the coupling 10', and therefore the pipe 20', when mounted to the channel-section track 12'

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A pipe insulation coupling for securing a pipe and adjacent ends of insulation tubing surrounding the pipe to a channel-section track having a pair of inwardly turned flanges defining a slot and an engagement surface, said pipe insulation coupling comprising:

an integrally molded, one-piece elongated cylindrical body extending along a longitudinal axis between a first end and a second end, said elongated cylindrical body including an outer tube wall extending between said first and second ends, and a planar interior wall fixedly secured to said outer tube wall midway between said first and second ends and extending inwardly from said outer tube wall transverse to said longitudinal axis, said planar interior wall including a center bore for receiving the pipe therethrough and defining opposing first and second channels extending from said planar interior wall to said first and second ends for receiving the adjacent ends of the insulation tubing therein; and a pair of flexible and resilient legs, each of said pair of flexible and resilient legs extends between a proximal end fixedly secured to said outer tube wall and a distal end including opposing notches formed therein, wherein both of said opposing notches are simultaneously engaged with the pair of inwardly turned flanges of the channel-section track to lock said pipe insulation coupling to the channel-section track.

2. A pipe insulation coupling as set forth in claim 1 wherein said opposing notches formed in each of said pair of flexible and resilient legs define a pair of independently flexible opposing fingers at said distal end thereof, said fingers allow for inserting said distal end of each of said legs through the slot in the channel-section track.

3. A pipe insulation coupling as set forth in claim 2 including a base protruding from said outer tube wall between said pair of flexible and resilient legs, said base co-operating with the engagement surface of the channel-section track when said pipe insulation coupling is lockingly mounted to the channel-section track.

4. A pipe insulation coupling as set forth in claim 3 wherein said base includes a flat mounting surface co-operating with the engagement surface of the channel-section track when said pipe insulation coupling is lockingly mounted to the channel-section track.

5. A pipe insulation coupling as set forth in claim 4 wherein said elongated cylindrical body is split longitudinally from said first end to said second end defining a first body portion and a second body portion.

6. A pipe insulation coupling as set forth in claim 5 including a releasable clamp extending along said split longitudinally between said first and second ends of said elongated cylindrical body for securing said first and second body portions together to retain the pipe and adjacent ends of insulation tubing.

7. A pipe insulation coupling as set forth in claim 6 wherein said releasable clamp includes a female member defining a shoulder for locking engagement with a notch defined in a male member.

8. A pipe insulation coupling as set forth in claim 7 wherein said female member defines a tongue extending circumferentially with said outer tube wall and having a first end surface and said male member defines a recessed step for receiving said tongue and having a second end surface for abutting said first end surface prior to said locking engagement between said female and male members.

9. A pipe insulation coupling as set forth in claim 8 wherein said first end surface of said female member is parallel to said second end surface of said male member.

10. A pipe insulation coupling as set forth in claim 9 wherein each of said first and second body portions include at least one living hinge for flexibly pivoting said first and second body portions between an open position adapted to receive the pipe and the insulation tubing and a closed position coupled about the pipe and adjacent ends of the insulation tubing.

11. A pipe insulation coupling as set forth in claim 10 wherein each of said living hinges is defined by a linear slot portion extending radially through said planar interior wall between said center bore and said outer tube wall, and an arcuate slot portion intersecting an end of said linear slot and extending adjacent said outer tube wall.

12. A pipe insulation coupling as set forth in claim 11 wherein each of said first and second body portions includes a pair of angularly spaced apart living hinges.

13. A pipe insulation coupling as set forth in claim 12 wherein said outer tube wall includes a tapered inner surface extending from each of said first and second ends to said planar interior wall for gradually decreasing the space defined by said first and second channels.

14. A pipe insulation coupling as set forth in claim 13 wherein said tapered inner surface of said outer tube wall tapers inwardly from each of said first and second ends to said planar interior wall to decrease the space defined by said first and second channels such that the space between said outer tube wall and the pipe is less adjacent said planar interior wall than the space adjacent said first and second ends.

15. A pipe insulation coupling as set forth in claim 9 wherein said planar interior wall defines a first upper tab, a second upper tab, and a lower tab.

16. A pipe insulation coupling as set forth in claim 15 wherein said first upper tab extends angularly from generally 12:45 to generally 2:15, said lower tab extends angularly from generally 4:00 to generally 8:00, and said second upper tab extends angularly from generally 9:45 to generally 11:15.

17. A pipe insulation coupling as set forth in claim 16 wherein said first end surface of said female member and said second end surface of said male member are parallel and angled from vertical.

18. A pipe insulation coupling as set forth in claim 17 wherein said base includes first and second portions extending into the slot of the channel-section track when said pipe insulation coupling is lockingly mounted to the channel-section track.

19. A pipe insulation coupling as set forth in claim 18 wherein said outer tube wall includes a tapered inner surface extending from each of said first and second ends to said planar interior wall for gradually decreasing the space defined by said first and second channels.

20. A pipe insulation coupling as set forth in claim 19 wherein said tapered inner surface of said outer tube wall tapers inwardly from each of said first and second ends to said planar interior wall to decrease the space defined by said first and second channels such that the space between said outer tube wall and the pipe is less adjacent said planar interior wall than the space adjacent said first and second ends.

21. A pipe insulation coupling for securing a pipe and adjacent ends of insulation tubing surrounding the pipe to a channel-section track having a pair of inwardly turned flanges defining a slot and an engagement surface, said pipe insulation coupling comprising:

an integrally molded, one-piece elongated cylindrical body extending along a longitudinal axis between a first end and a second end, said elongated cylindrical body including an outer tube wall extending between said first and second ends, and a planar interior wall fixedly secured to said outer tube wall midway between said first and second ends and extending inwardly from said outer tube wall transverse to said longitudinal axis, said planar interior wall including a center bore for receiving the pipe therethrough and defining opposing first and second channels extending from said planar interior wall to said first and second ends for receiving the adjacent ends of the insulation tubing therein, wherein said elongated cylindrical body is split longitudinally from said first end to said second end defining a first body portion and a second body portion;

a releasable clamp extending along said split longitudinally between said first and second ends of said elongated cylindrical body for securing said first and second body portions together, wherein said releasable clamp includes a female member for locking engagement with a male member, said female member defining a tongue extending circumferentially with said outer tube wall and having a first end surface and said male member defining a recessed step for receiving said tongue and having a second end surface for abutting said first end surface prior to said locking engagement with said female member; and a pair of flexible and resilient legs extending between a proximal end fixedly secured to said outer tube wall and a distal end including opposing notches formed therein, said opposing notches for selective engagement with the pair of inwardly turned flanges of the channel-section track thereby locking said pipe insulation coupling to the channel-section track.

22. A pipe insulation coupling for securing a pipe and adjacent ends of insulation tubing surrounding the pipe to a channel-section track having a pair of inwardly turned flanges defining a slot and an engagement surface, said pipe insulation coupling comprising:

an integrally molded, one-piece elongated cylindrical body extending along a longitudinal axis between a first end and a second end, said elongated cylindrical body including an outer tube wall extending between said first and second ends, and a planar interior wall fixedly secured to said outer tube wall midway between said first and second ends and extending inwardly from said outer tube wall transverse to said longitudinal axis, said planar interior wall including a center bore for receiving the pipe therethrough and defining opposing first and second channels extending from said planar interior wall to said first and second ends for receiving the adjacent ends of the insulation tubing therein; and a pair of flexible and resilient legs, each of said pair of flexible and resilient legs includes a forward edge adjacent to said first end of said outer tube wall and a rearward edge adjacent to said second end of said outer tube wall and extends between a proximal end fixedly secured to said outer tube wall and a distal end including opposing notches formed in said forward and rearward edges, wherein both of said opposing notches are simultaneously engaged with the pair of inwardly turned flanges of the channel-section track to lock said pipe insulation coupling thereto.

\* \* \* \* \*